United States Patent
Wei

(10) Patent No.: US 10,823,937 B2
(45) Date of Patent: Nov. 3, 2020

(54) LENS MODULE WITH A PRESSURE-PROOF PART WITH AT LEAST ONE NOTCH PENETRATING A TOP WALL AND COMMUNICATING WITH A RECEIVING SPACE

(71) Applicant: AAC Technologies Pte. Ltd., Singapore (SG)

(72) Inventor: Chuandong Wei, Shenzhen (CN)

(73) Assignee: AAC Optics Solutions Pte. Ltd., Singapore (SG)

( * ) Notice: Subject to any disclaimer, the term of this patent is extended or adjusted under 35 U.S.C. 154(b) by 0 days.

(21) Appl. No.: 16/528,687

(22) Filed: Aug. 1, 2019

(65) Prior Publication Data
US 2020/0049953 A1 Feb. 13, 2020

(30) Foreign Application Priority Data
Aug. 8, 2018 (CN) .................... 2018 2 1275990 U

(51) Int. Cl.
*G02B 13/00* (2006.01)
*H04N 5/225* (2006.01)

(52) U.S. Cl.
CPC ....... *G02B 13/0015* (2013.01); *H04N 5/2254* (2013.01)

(58) Field of Classification Search
CPC .................... G02B 13/0015; H04N 5/2254
See application file for complete search history.

(56) References Cited

U.S. PATENT DOCUMENTS

2004/0075916 A1* 4/2004 Peachee ............... A01K 63/006
359/813
2010/0271541 A1* 10/2010 Chou ................... G02B 7/08
348/374

* cited by examiner

*Primary Examiner* — Nicholas G Giles
(74) *Attorney, Agent, or Firm* — W&G Law Group LLP

(57) ABSTRACT

The present disclosure relates to the technical field of optical lenses and discloses a lens module. The lens module includes: a lens; a lens barrel receiving the lens; a lens seat receiving the lens barrel; and a pressure-proof part having a receiving space. The lens barrel is installed into the lens seat from an object side of the lens seat to form an imaging body. The pressure-proof part includes a top wall forming a through hole and disposed at an object side of the lens barrel and a side wall extending from an edge of the top wall facing away from an optical axis while being bent towards an image side, the top wall and the side wall forming the receiving space. The receiving space receives at least a portion of the imaging body.

11 Claims, 2 Drawing Sheets

LENS MODULE WITH A PRESSURE-PROOF PART WITH AT LEAST ONE NOTCH PENETRATING A TOP WALL AND COMMUNICATING WITH A RECEIVING SPACE

TECHNICAL FIELD

The present disclosure relates to the technical field of optical lenses, and in particular, to a lens module.

BACKGROUND

With development of technologies, electronic devices are becoming more and more intelligent. In addition to digital cameras, portable electronic devices such as tablets and mobile phones are also equipped with a lens module. The lens module in the related art usually includes a lens, a lens barrel receiving the lens, and a lens seat receiving the lens barrel.

The inventors have found a problem existing in the related art that since components in an electronic device are densely distributed, during an assembly process of assembling a lens module into the electronic device, the components in the electronic device disposed around the lens module might be in hard contact with or even press the lens barrel and the lens seat of the lens module. As a result, damage of the lens module is easily caused, thereby affecting the performance of the lens module.

BRIEF DESCRIPTION OF DRAWINGS

Many aspects of the exemplary embodiment can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DESCRIPTION OF EMBODIMENTS

The present disclosure will be further illustrated with reference to the accompanying drawings and the embodiments.

Figure 1:
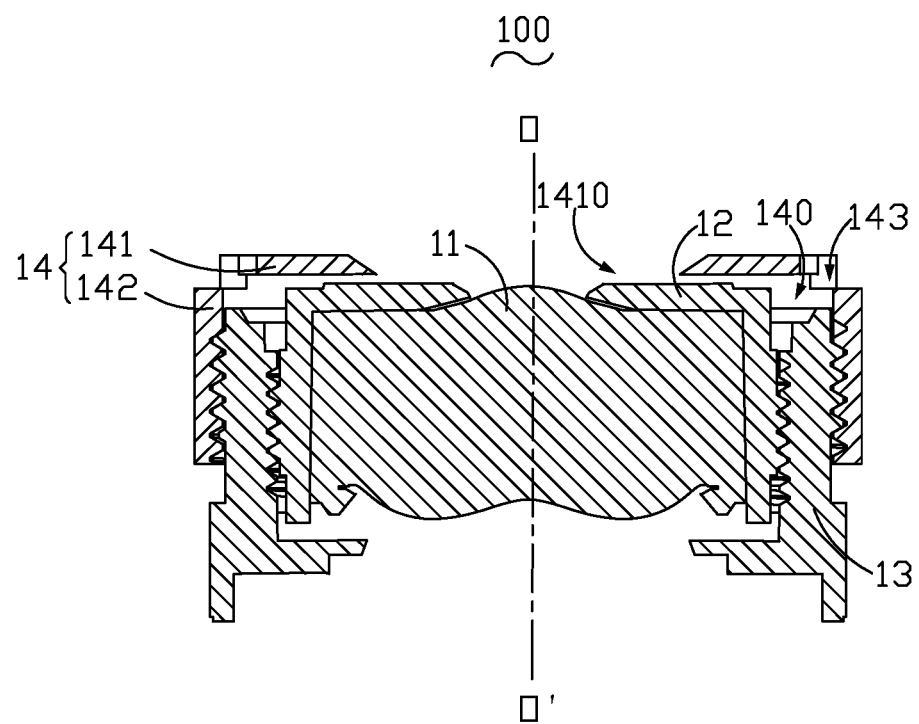
FIG. 1 is a cross-sectional structural schematic view of a lens module according to an embodiment of the present disclosure.
Figure 2:
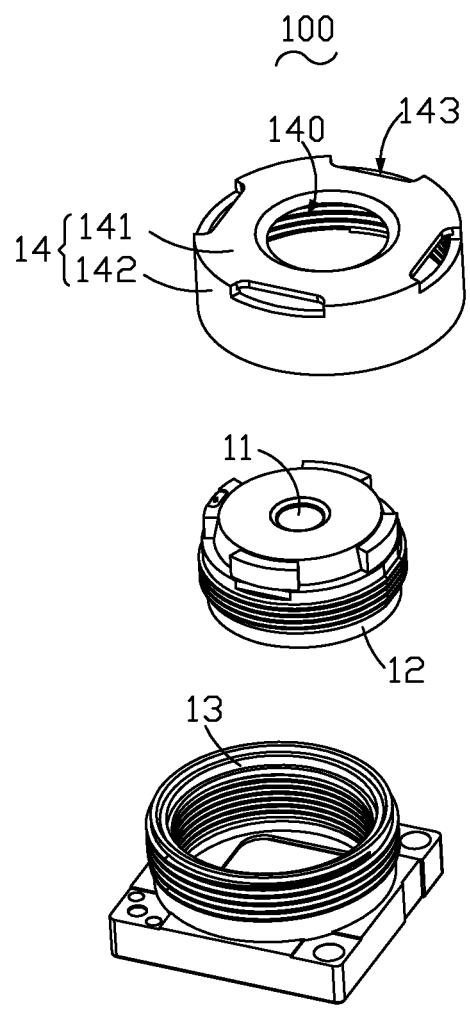
FIG. 2 is an exploded view of a lens module according to an embodiment of the present disclosure.

A first embodiment of the present disclosure relates to a lens module 100. As shown in FIG. 1 and FIG. 2, the lens module 100 includes a lens 11, a lens barrel 12, a lens seat 13, and a pressure-proof part 14. The lens barrel 12 receives the lens 11, and the lens seat 13 receives the lens barrel 12. The lens barrel 12 is installed into the lens seat 13 from an object side of the lens seat 13 to form an imaging body. The pressure-proof part 14 includes a receiving space 140. The pressure-proof part 14 includes a top wall 141 and a side wall 142. The top wall 141 forms a through hole 1410 and presses the lens barrel 12. The side wall 142 extends from an edge of the top wall 141 facing away from the optical axis OO' while being bent towards an image side. The top wall 141 and the side wall 142 form a receiving space 140, and at least a portion of the imaging body is received within the receiving space 140. That is, at least a portion of the lens seat 13 and the lens barrel 12 are received in the receiving space 140.

Compared with the related art, in this embodiment of the present disclosure, the receiving space 140 formed by the top wall 141 and the side wall 142 of the pressure-proof part 14 at least partially receives the lens seat 1 and the lens barrel 12, so that the pressure-proof part can be used to separate the lens seat 13 and the lens barrel 12 from components in the electronic device disposed around the lens module 100. In this way, direct extrusion and collision of the components disposed around the lens module 100 against the lens barrel 12 and the lens seat 13 can be avoided, so that the lens module 100 is not easily damaged during the assembly process, thereby preventing a performance of the lens module 100 from being affected.

Details of the lens module according to this embodiment will be described in the following. However, it should be noted that the following description is merely implementation details provided for convenience of understanding, and is not necessary for implementing the solution of the present disclosure.

In this embodiment, the lens seat 13 and the lens barrel 12 are designed to be separate, and the receiving space 140 at least partially receiving the lens seat 13 and the lens barrel 12 means that the receiving space 140 receives an end of the lens barrel 12 close to an object side and an end of the lens seat 13 close to the object side. In an alternative embodiment of the present disclosure, the lens seat 13 and the lens barrel 12 may also be formed into one piece, and the lens seat 13 is arranged at an end of the lens barrel 12 close to the image side. In this case, the receiving space 140 at least partially receiving the lens seat 13 and the lens barrel 12 means that the receiving space 140 receives the entire lens barrel 12 and the end of the lens seat 13 close to the object side.

In this embodiment, the side wall 142 and the lens seat 13 are provided with threads, and the lens seat 13 is fixed to the side wall 142 by fitting the threads. It should be understood that in an alternative embodiment of the present disclosure, the side wall 142 may also be fixed to the lens seat 13 by other means. For example, the lens seat 13 is provided with a protrusion and the side wall 142 is provided with a recess, and the protrusion is embedded in the recess. No matter in what way, it is within a protection scope of the present disclosure as long as the side wall 142 is fixed to the lens seat 13.

It should be noted that the pressure-proof part 14 is provided with a notch 143 extending through the top wall 141 and communicating with the receiving space 140. An adhesive can be filled into the receiving space 140 via the notch 143, so that the lens barrel 12, the lens seat 13 and the pressure-proof part 14 can be more securely fixed, thereby improving reliability of the overall lens module 100.

In this embodiment, preferably, the notch 143 reaches an outer edge of the top wall 141, and the notch 143 penetrates the side wall 142. That is, the notch 143 is open, and the notch 143 is open from the outer edge of the top wall 141 towards an inner edge of the top wall 141. Since the outer edge is open, filling of the adhesive is facilitated, thereby preventing the side wall 142 from obstructing filling of the adhesive. In this way, an operation efficiency of filling of the adhesive then can be improved.

In an alternative embodiment of the present disclosure, the notch 143 may also be spaced from the outer edge of the top wall 141. The side wall 142 is not penetrated by the notch 143. That is, the notch 143 is not open, the outer edge of the top wall 141 is not open, and the notch 142 is disposed between the outer edge and the inner edge of the top wall 141. In this case, compared with the outer edge of the top wall 141 being open, an adverse influence of the notch 143 on the structural strength of the pressure-proof part 14 can be reduced, and the outer edge of the top wall 141 can be used to block the adhesive during filling of the adhesive, thereby preventing the adhesive from flowing out from the outer edge of the top wall 141, and thus reducing waste of the adhesive.

It should be noted that at least two notches 143 are provided. In this way, the adhesive can be filled into the receiving space 140 from at least two notches 143, thereby increasing a bonding area between the lens seat 13, the lens barrel 12 and the pressure-proof part 14, and thus increasing a bonding force between the lens seat 13, the lens barrel 12 and the pressure-proof part 14. Thus, the lens seat 13, the lens barrel 12 and the pressure-proof part 14 can be more securely fixed.

It should be noted that the notches 143 are equally spaced around an optical axis OO'. In this way, the bonding force between the lens seat 13, the lens barrel 12 and the pressure-proof part 14 can be evenly distributed, thereby further improving reliability of the lens module 100.

It should be noted that the notch 143 has an arc shape about the optical axis OO' of the lens barrel 12, and the arc shape corresponds to a central angle that is larger than 0° and smaller than 90°. In this way, the influence on the structural strength of the pressure-proof part 14 can be reduced, and the notch 143 can be prevented from being extremely large, which would otherwise cause the lens barrel 12 and the lens seat 13 to be exposed out of the notch 143 to press and collide against the components around the lens module 100, resulting in damage of the lens module 100. Thus, this can avoid affection on the performance of the lens module 100.

It should be understood by those skilled in the art that the above embodiments are merely some specific embodiments of the present disclosure, and various changes in form and details may be made without departing from the scope of the present disclosure.

What is claimed is:

1. A lens module, comprising:
a lens;
a lens barrel receiving the lens;
a lens seat receiving the lens barrel; and
a pressure-proof part having a receiving space,
wherein the lens barrel is installed into the lens seat from an object side of the lens seat to form an imaging body; the pressure-proof part comprises a top wall forming a through hole and disposed at an object side of the lens barrel and a side wall extending from an edge of the top wall facing away from an optical axis while being bent towards an image side, the top wall and the side wall forming the receiving space; and the receiving space receives at least a portion of the imaging body, and the pressure-proof part is provided with at least one notch penetrating the top wall and communicating with the receiving space.

2. The lens module as described in claim 1, wherein the side wall and the lens seat are provided with threads, and the lens seat is fixed to the side wall by fitting the threads.

3. The lens module as described in claim 1, wherein the at least one notch is spaced from an outer edge of the top wall.

4. The lens module as described in claim 1, wherein the at least one notch reaches an outer edge of the top wall, and the at least one notch penetrates the side wall.

5. The lens module as described in claim 3, wherein the at least one notch comprises at east two notches.

6. The lens module as described in claim 4, wherein the at least one notch comprises at least two notches.

7. The lens module as described in claim 5, wherein the at least two notches are equally spaced around the optical axis.

8. The lens module as described in claim 6, wherein the at least two notches are equally spaced around the optical axis.

9. The lens module as described in claim 7, wherein each of the at least two notches has an arc shape about the optical axis of the lens barrel, and the arc shape corresponds to a central angle that is larger than 0° and smaller than 90°.

10. The lens module as described in claim 8, wherein each of the at least two notches has an arc shape about the optical axis of the lens barrel, and the arc shape corresponds to a central angle that is larger than 0° and smaller than 90°.

11. The lens module as described in claim 1, wherein the lens seat and the lens barrel are formed into one piece.

* * * * *